United States Patent Office 3,048,714
Patented Aug. 7, 1962

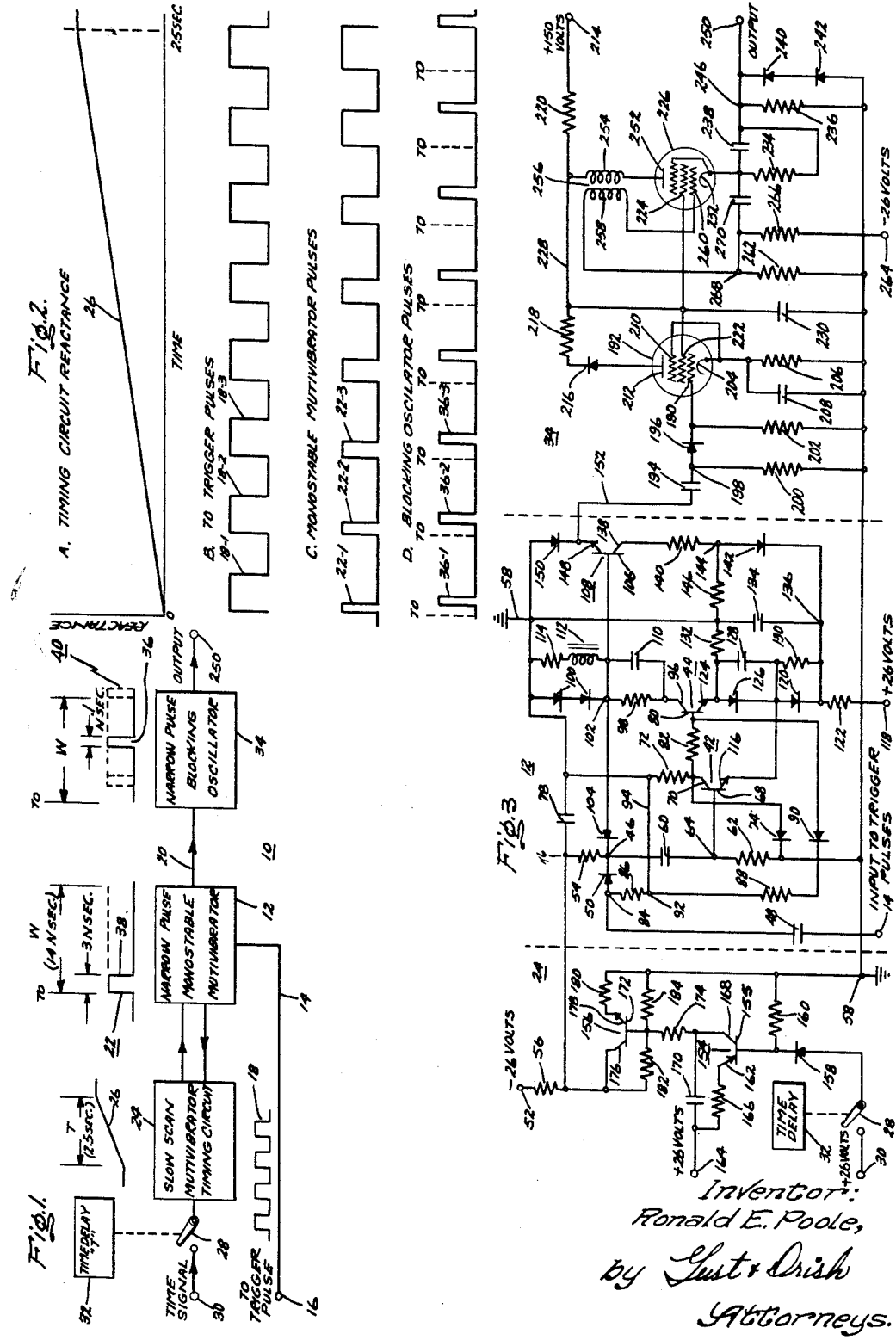

3,048,714
VARIABLE PULSE WIDTH GENERATING SYSTEM
Ronald E. Poole, Caldwell Township, N.J., assignor to International Telephone and Telegraph Corporation
Filed June 24, 1960, Ser. No. 38,641
11 Claims. (Cl. 307—88.5)

This invention relates generally to systems for providing a train of recurrent pulses and more particularly to a system for generating a train of pulses having successively greater widths.

There are instances in the design of electronic circuitry where it is desirable to provide a system for generating a train of pulses with the width of the pulses being linearly increased over a predetermined period; such a system finds utility in the provision of a delayed pulse trailing edge for timing and measurement purposes, such as that described and illustrated in my co-pending application Serial Number 32,009, filed May 26, 1960, and assigned to the assignee of the present application.

It is accordingly an object of my invention to provide a system for generating a train of pulses having successively greater widths.

Another object of my invention is to provide a system for generating a train of pulses having successively greater intervals therebetween.

A further object of my invention is the provision of a system providing an impedance characteristic which varies linearly in saw-tooth fashion.

The system of my invention, in its broader aspects, provides a source of first pulses of uniform width and repetition frequency and means responsive to the first pulses for generating second pulses of variable width. Means are provided for progressively increasing the width of the second pulses over a predetermined period during which a plurality of the first pulses occur. In the preferred embodiment of my invention, the second pulse generating means is a monostable multivibrator triggered by the first pulses and having a time constant circuit for determining the width of the second pulses. In the preferred embodiment, the width of the second pulses is linearly increased by means of variable impedance means coupled to the time constant circuit of the multivibrator and saw-tooth generator means coupled to the variable impedance means for varying the impedance thereof in sawtooth fashion.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram showing the fundamental elements of the system of my invention;
FIG. 2 illustrates waveforms found in the system of FIG. 1; and
FIG. 3 is a schematic illustration showing the preferred embodiment of my invention for providing a train of pulses with the interval between pulses increasing linearly over a predetermined period.

Referring now to FIG. 1, my improved system, generally identified at 10, comprises a monostable multivibrator 12 having its triggering input circuit 14 coupled to a source 16 of recurrent trigger pulses 18 of uniform width and repetition frequency. Monostable multivibrator 12 is triggered by trigger pulses 18 to provide in its output circuit 20 narrow pulses 22 of variable width.

Monostable multivibrator 12 includes a time constant circuit for determining the width of the pulses 22 to which is connected a slow scan timing circuit 24. Slow scan timing circuit 24 may be a variable impedance device, the impedance of which is varied in sawtooth fashion, as indicated at 26 over period T; period T is sufficiently long that a plurality of trigger pulses 18 occur prior to its expiration and in the specific embodiment of my invention, period T has a duration of 2.5 seconds with trigger pulses 18 having a repetition frequency of 500 pulses per second. Thus, in the specific embodiment 1250 trigger pulses 18 will occur during the period T of 2.5 seconds.

Timing circuit 24, together with the time constant circuit of multivibrator 12 are arranged so that the width of the pulses 22 provided by multivibrator 12 is linearly increased from a minimum width, such as three microseconds, as shown, to a maximum width W, which may for example be fourteen microseconds over the period T. Thus, each successive pulse 22 provided by multivibrator 12 in response to each successive trigger pulse 18 is initiated at time $T_0$ coincident with the leading edge of the respective trigger pulse 18, but is wider than its predecessor in response to the sawtooth impedance characteristic 26 provided by timing circuit 24 so that over the period T, pulses 22 progressively and linearly increase in width from an initially narrow pulse to a pulse having width W.

The action of timing circuit 24 is initiated by switch 28 which couples the timing circuit 24 to a sutable source 30 of energizing potential; switch 28 may be closed and then opened again after period T by any suitable time delay mechanism 32, as is well known to those skilled in the art.

A narrow pulse blocking oscillator 34 is provided coupled to output circuit 20 of monostable multivibrator 12 and providing one narrow pulse 36 in response to the trailing edge 38 of each pulse 22 provided by monostable multivibrator 12. Thus, as shown at 40 in FIG. 1, each successive pulse 36 provided by blocking oscillator 34 occurs a longer time after $T_0$ than its immediate predecessor. The pulses 36 provided by the narrow pulse blocking oscillator 34 are preferably substantially narrower than trigger pulses 18; in the specific embodiment, pulses 36 have a width of .1 microsecond. It will now be seen that there is provided one pulse 36 for each trigger pulse 18 and pulse 22, each successive pulse 36 being delayed from the leading edge $T_0$ of its respective trigger pulse 18 and pulse 22 by a longer period equal to the width of the respective pulse 22. It will thus be seen that over period T, the train of pulse 36 has successively greater intervals between pulses.

Referring now to FIG. 2, the mode of operation of FIG. 1 will be further explained by the use of the waveforms shown. The diagram A of FIG. 2 shows the impedance characteristic 26 provided by slow scan multivibrator timing circuit 24 over the period T, shown to be 2.5 seconds. A previously indicated, increased impedance inserted in the time constant circuit of monostable multivibrator 12 provides output pulses 22 of increased width or duration, and thus, as the impedance characteristic 26 is progressively increased in sawtooth fashion, as shown, over the period T, each successive pulse 22 provided by the monostable multivibrator 12 will have its width increased.

In FIG. 2B, there is shown a train of trigger pulses 18, it being understood that whereas only eight such pulses 18 are shown as occurring during the period T of 2.5 seconds, in actual practice, as indicated, trigger pulses 18 will have a pulse repetition frequency which may be on the order of 500 pulses per second, and thus there would actually be 1250 trigger pulses 18 occurring during the period T of 2.5 seconds.

In FIG. 2C there is shown the progressively longer pulses 22 provided by monostable multivibrator 12, it being observed that the first pulse 22–1 has a minimum width of three microseconds and that each successive pulse 22–2, 22–3, etc. is progressively longer by virtue of the linear increase of the impedance provided by multivibrator timing circuit 24. It will be observed that the leading edge of each trigger pulse 18 triggers monostable multivibrator 12 to initiate the respective output pulse 22.

Referring now to FIG. 2D, it will be recalled that the blocking oscillator pulses 36 were triggered by the trailing edge of pulses 22 provided by monostable multivibrator 12. It will thus be observed that each successive pulse 36–1, 36–2, 36–3, etc. occurs after a longer time delay following $T_0$, i.e., the leading edge of the respective trigger pulses 18–1, 18–2, 18–3, etc., the time delay of the respective narrow pulse 36 being the same as the duration of the respective pulse 22, as shown clearly in FIG. 2.

Turning now to FIG. 3, there is shown the specific circuitry of the preferred embodiment of the system of FIG. 1. Monostable multivibrator 12 comprises two transistors 42 and 44. The trigger pulses 18 are applied at input circuit 14 which is coupled to point 46 by a coupling capacitor 48 and diode 50. Point 46 is coupled to a −26 volt source of negative potential 52 by resistors 54 and 56. Point 46 is connected to ground 58 by a serially connected capacitor 60 and resistor 62 with point 64 therebetween being directly connected to base 68 of transistor 42. Collector 70 of transistor 42 is connected to ground 58 by resistor 72 and also by diode 74. Point 76 between resistors 54 and 56 is connected to ground 58 by capacitor 78. Collector 70 of transistor 42 is connected to base 80 of transistor 44 by resistor 82 and base 80 is connected to point 84 between capacitor 48 and diode 50 by serially connected resistors 86 and 88 and diode 90. Point 92 between resistors 86 and 88 is connected to ground 58 by connection 94, as shown.

Collector 96 of transistor 44 is connected to ground 58 by resistor 98 and diode 100. Point 102 between resistor 98 and diode 100 is connected to point 46 by diode 104 and is also connected to base 106 of output transistor 108. Capacitor 110 is connected in shunt across resistor 98 and point 102 is also connected to ground 58 by serially connected inductance 112 and resistor 114, as shown.

Emitter 116 of transistor 42 is connected to source 118 of +26 volt potential by serially connected diode 120 and resistor 122. Emitter 124 of transistor 44 is connected to emitter 116 of transistor 42 by diode 126, capacitor 128 being connected in shunt across diode 126 and resistor 130 being connected in shunt across diode 120. Emitter 124 of transistor 44 is also connected to ground 58 by resistor 132 with capacitor 134 connecting point 136 between diode 120 and resistor 122 to ground, as shown.

Collector 138 of transistor 108 is serially connected to point 136 by resistor 140 and diode 142, with point 144 therebetween being connected to ground 58 by resistor 146, as shown. Emitter 148 of transistor 108 is connected to ground 58 by diode 150. Emitter 148 is also connected to output circuit 152, as shown.

Timing circuit 24 comprises transistors 154 and 156, transistor 154 having its base 155 connected to timing signal source 30 which may be positive 26 volts by a switch 28 and diode 158. Base 155 is also connected to ground 58 by resistor 160. Emitter 162 of transistor 154 is connected to source 164 of suitable positive potential such as +26 volts by resistor 166 and collector 168 of transistor 154 is connected to source 164 by capacitor 170; it will be recognized that resistor 166 in series with the emitter 162, collector 168 of transistor 154, and capacitor 170 in parallel across resistor 166, emitter 162 and collector 168 form a time constant circuit for determining the duration of the sawtooth voltage characteristic generated by the time circuit 34.

Collector 168 of transistor 154 is also connected to base 172 of transistor 156 by resistor 174. Collector 176 of transistor 156 is connected to source 52 of −26 volt potential by resistor 56 and emitter 178 is connected to ground 58 by resistor 180, as shown. Resistor 182 connects base 172 to collector 176 of transistor 156 and resistor 184 connects base 172 to ground 58, as shown.

The operation of monostable multivibrator 12 is conventional and well known to those skilled in the art, and therefore need not be more fully described other than to state that capacitor 60 together with the impedance of transistor 156 of timing circuit 24 and its associated resistors 180, 182, and 184 constitute the time constant circuit for multivibrator 12, thereby to determine the width or duration of its output pulses 22. It will be observed that the resistors 182 and 184 are connected between ground 58 and the source of negative 26 volt potential 52, thus constituting a voltage divider to provide a normal base bias for base 172 of transistor 156 so that the transistor 156 normally conducts heavily in the absence of a negative-going signal applied to its base. With transistor 156 conducting heavily, i.e., with a heavy current flow between its collector 176 and emitter 178, resistors 182 and 184 are in essence short-circuited so that the resistance provided in the time constant circuit of monostable multivibrator 12 is in essence that of resistor 180. In the present system, the width or duration of pulses 22 provided by monostable multivibrator 12 responds to the formula $KT=C_xR_x$. Thus, with the C of the foregoing formula being provided by capacitor 60, it will be readily apparent that as the resistance R is increased, the time delay and thus the width of pulses 22 will be increased.

In order to provide the foregoing increase in resistance in the time constant circuit of monostable multivibrator 12, switch 28 is closed, thus impressing the positive 26 volt potential upon base 155 of transistor 154. Transistor 154 is normally conducting and this sudden increase of base potential provided by closing the switch 28 turns transistor 154 off. As indicated, resistor 166 and capacitor 170, in conjunction with transistor 154 form a sawtooth waveform voltage generating circuit, thereby impressing a linearly decreasing sawtooth voltage characteristic upon the base 172 of transistor 156. This linear decrease in the voltage applied to base 172 of transistor 156 is in the direction to turn transistor 156 off, thus reducing its conduction and in turn its collector-to-emitter current flow. Reduction of the conduction of transistor 156 results in increasing the net resistance R of the time constant circuit of multivibrator 12; with transistor 156 completely cut-off, the resistance $R_x$ in the time constant circuit of multivibrator 12 is essentially that provided by serially connected resistors 182 and 184. It will be readily apparent that the time delay T provided by the time delay device 36 is preferably slightly less than the time constant of the sawtooth generator circuit formed by resistor 166 and capacitor 170, and thus if the desired period T is to be 2.5 seconds, the time constant provided by resistor 166 and capacitor 170 should be on the order of 2.6 seconds.

Blocking oscillators and their mode of operation are well known to those skilled in the art, and therefore it will be understood that the specific circuit shown in FIG. 3 is for illustrative purposes only. Here, output circuit 152 of the monostable multivibrator 12 is serially connected to control grid 190 of pentode 192 by coupling capacitor 194 and diode 196 with point 198 between capacitor 194 and diode 196 being connected to ground 58 by resistor 200 and with grid 190 likewise being connected to ground 58 by resistor 202. Cathode 204 of tube 192 is connected to ground by resistor 206 with capacitor 208 connected in shunt thereacross. Suppressor grid 210 of pentode 192 is directly connected to cathode 204 in accordance with conventional practice. Plate 212 is connected to a suitable source 214 of positive plate potential, such as +150 volts, by serially connected diode 216, resistor 218 and resistor 220.

Screen grid 222 of pentode 192 is connected to screen grid 224 of pentode 226 and to point 228 between resistors 218 and 220. Screen grids 222 and 224 are also connected to ground 58 by capacitor 230. Cathode 232 of pentode 226 is connected to ground 58 by serially connected resistors 234 and 236 with resistor 234 having capacitor 238 connected in shunt thereacross and resistor 236 having clamping diodes 240 and 242 serially connected thereacross. Point 246 between resistors 234 and 236 is connected to output terminal 250.

Plate 252 of pentode 226 is connected to point 228 by primary winding 254 of feedback transformer 256 with secondary winding 258 having one end directly connected to control grid 260 and its other end 268 connected to ground 58 by resistor 262 and to source 264 of negative 26 volt potential by resistor 266. End 268 of secondary winding 258 is connected to cathode 232 of pentode 226 by capacitor 270. It will be recognized that the circuitry just described is a conventional blocking oscillator circuit and thus that its mode of operation need not be further described.

In a specific system constructed in accordance with FIG. 3, the following component values were employed:

| | | |
|---|---|---|
| Transistor 42 | | 2N404 |
| Transistor 44 | | 2N404 |
| Capacitor 48 | micromicrofarads | 470 |
| Diode 50 | | 1N198 |
| Resistor 54 | ohms | 2740 |
| Resistor 56 | do | 22 |
| Resistor 62 | do | 715 |
| Resistor 72 | do | 1,500 |
| Diode 74 | | 1N198 |
| Capacitor 78 | microfarads | 10 |
| Resistor 82 | ohms | 100 |
| Resistor 86 | do | 10,000 |
| Resistor 88 | do | 10,000 |
| Diode 90 | | 1N198 |
| Resistor 98 | ohms | 22 |
| Diode 100 | | 1N748 |
| Diode 104 | | 1N198 |
| Transistor 108 | | 2N388 |
| Capacitor 110 | micromicrofarads | 1,000 |
| Inductance 112 | mh | 470 |
| Resistor 114 | ohms | 100 |
| Diode 120 | | 1N751 |
| Resistor 122 | ohms | 22 |
| Diode 126 | | 1N749 |
| Capacitor 128 | microfarads | 1 |
| Resistor 130 | ohms | 249 |
| Resistor 132 | do | 22,000 |
| Capacitor 134 | microfarads | 10 |
| Resistor 140 | ohms | 100 |
| Diode 142 | | 1N756 |
| Resistor 146 | ohms | 15,000 |
| Diode 150 | | 1N753 |
| Transistor 154 | | 2N525 |
| Transistor 156 | | 2N167 |
| Diode 158 | | 1N457 |
| Resistor 160 | ohms | 680,000 |
| Resistor 166 | do | 1,000 |
| Capacitor 170 | microfarads | 40 |
| Resistor 174 | ohms | 10,000 |
| Resistor 180 | do | 220 |
| Resistor 182 | do | 100,000 |
| Resistor 184 | do | 1,000 |
| Pentode 192 | | 6AH6 |
| Capacitor 194 | micromicrofarads | 470 |
| Diode 196 | | 1N276 |
| Resistor 200 | ohms | 10,000 |
| Resistor 202 | do | 10,000 |
| Resistor 206 | do | 10,000 |
| Capacitor 208 | microfarads | 1 |
| Diode 216 | | 1N276 |
| Resistor 218 | ohms | 100 |
| Resistor 220 | do | 1,000 |
| Pentode 226 | | 6AN5WA |
| Capacitor 230 | microfarads | 0.1 |
| Resistor 234 | ohms | 47 |
| Resistor 236 | do | 680 |
| Capacitor 238 | microfarads | .001 |
| Diode 240 | | 1N758A |
| Diode 242 | | 1N758A |
| Resistor 262 | ohms | 19,600 |
| Resistor 266 | do | 10,000 |
| Capacitor 270 | microfarads | .047 |

It will be readily apparent that the monostable multivibrator and timing circuit 24 of my invention may be employed alone in instances where it is desired merely to provide pulses of progressively increasing width over period D, and it will also be readily apparent that the timing circuit 24 of my invention has utility alone in providing an impedance characteristic which varies in sawtooth fashion.

While I have described above the principles of my invention in connection with specific apparatus, it is to be clearly understood that this description is made only by way of example and not as a limitation to the scope of my invention.

What is claimed is:

1. A system for generating a train of pulses having successively greater widths comprising: a source of first pulses of unit form width and repetition frequency; means coupled to said first pulses source and responsive to said first pulses for generating second pulses of variable width, said second pulses generating means including time constant means for determining the width of said second pulses; and sawtooth generator means coupled to said time constant means for linearly varying the same in sawtooth fashion over a predetermined period during which a plurality of said first pulses occur, thereby to linearly increase the width of said second pulses over said period.

2. The combination of claim 1 wherein said second pulses generating means is a monostable multivibrator triggered by said first pulses; and wherein said time constant means comprises variable impedance means with said sawtooth generator means being coupled thereto for linearly varying the impedance of the same in sawtooth fashion over said predetermined period.

3. A system for generating a train of pulses having successively greater widths comprising: a source of first pulses of uniform width and repetition frequency; means coupled to said first pulses source and triggered by said first pulses for generating second pulses of variable width, said second pulses generating means having a time constant circuit including impedance means for determining the width of said second pulses; and a variable impedance circuit for linearly varying the impedance thereof thereby to increase the width of said second pulses, said variable impedance circuit comprising fixed impedance means and variable impedance means coupled in parallel across said time constant circuit, the impedance of said variable impedance means being variable from a low extreme value in which said fixed impedance means is essentially short circuited to a high extreme value in which the impedance of said variable impedance circuit is essentially that of said fixed impedance means, and sawtooth generating means coupled to said variable impedance means for varying the impedance thereof from one extreme value to the other extreme value in sawtooth fashion over a predetermined period during which a plurality of said first pulses occur thereby linearly increasing the impedance of said time constant circuit and the width of said second pulses over said period.

4. A system for generating a train of pulses having successively greater widths comprising: a source of first pulses of uniform width and repetition frequency; means coupled to said first pulses source and triggered by said first pulses for generating second pulses of variable width, said second pulses generating means having a time constant circuit including impedance means for determining the width of said second pulses; and a variable impedance circuit for linearly increasing the impedance thereof thereby to increase the width of said second pulses, said variable impedance element comprising a valve device having first and second rectifying elements serially coupled with a source of potential and coupled across said time constant circuit, said valve device having a control element, fixed resistance elements respectively coupling said control element to said rectifying elements, said valve device being normally conducting thereby essentially short circuiting said fixed resistance elements, and a sawtooth waveform voltage generating circuit coupled to said control element for applying a voltage thereto which varies linearly in sawtooth fashion over a predetermined period during which a plurality of said first pulses occur thereby to reduce the conduction of said valve device until the same is essentially cut-off whereby the impedance of said time constant circuit is linearly increased to increase the width of said second pulses over said period.

5. The combination of claim 4 wherein said second pulse generating means is a monostable multivibrator, wherein said valve device is a first transistor having its collector and emitter serially coupled with said potential source and having its base respectively coupled to said collector and emitter by said fixed resistance elements, and wherein said sawtooth voltage generating circuit comprises another transistor having its collector and emitter serially coupled with another resistance element between a source of potential and the base of said first transistor, a capacitor coupled across said other resistance element and the collector and emitter of said other transistor, and means for sequentially connecting and disconnecting the base of said other transistor to a source of potential thereby to initiate and terminate said period.

6. The combination of claim 1 further comprising means responsive to the trailing edges of said second pulses for generating third pulses of uniform width having successively greater intervals therebetween.

7. The combination of claim 2 further comprising a blocking oscillator coupled to said multivibrator and triggered responsive to the trailing edges of said second pulses for providing third pulses of uniform width having successively greater intervals therebetween.

8. A circuit for providing an impedance characteristic which varies linearly in sawtooth fashion comprising: fixed impedance means and variable impedance means coupled in parallel across an output circuit, the impedance of said variable impedance means being variable from a low extreme value in which said fixed impedance means is essentially short circuited, to a high extreme value in which the impedance across said output circuit is essentially that of said fixed impedance means; and sawtooth generator means coupled to said variable impedance means for varying the impedance thereof from one extreme value to the other extreme value with a sawtooth characteristic.

9. The combination of claim 8 wherein the sawtooth characteristic of said sawtooth generator means has a predetermined rise time, and further comprising means for actuating said sawtooth generator means for a predetermined period less than said rise time.

10. A circuit for providing a resistance characteristic which varies linearly in sawtooth fashion comprising: a valve device having first and second rectifying elements serially coupled with a source of potential and coupled across an output circuit, said valve device having a control element with fixed resistance elements respectively coupling the same to said rectifying elements, said valve device being normally conducting thereby essentially short circuiting said fixed resistance elements; and a sawtooth waveform voltage generating circuit coupled to said control element for applying a voltage thereto which varies linearly with a sawtooth characteristic over a predetermined period thereby to reduce the conduction of said valve device until the same is essentially cut-off whereby the impedance across said output circuit linearly increases to essentially that of said fixed resistance elements.

11. The combination of claim 10 wherein said valve device is a first transistor having its collector and emitter serially coupled with said potential source and having its base respectively coupled to said collector and emitter by said fixed resistance elements, and wherein said sawtooth voltage generating circuit comprises another transistor having its collector and emitter serially coupled with another resistance element between a source of potential and the base of said first transistor, a capacitor coupled across said other resistance element and the collector and emitter of said other transistor and forming with said other resistance element a time constant circuit for determining the rise time of said sawtooth voltage, and means for sequentially coupling and decoupling the base of said other transistor to a source of potential thereby to initiate and terminate said sawtooth voltage.

References Cited in the file of this patent
UNITED STATES PATENTS

| | | |
|---|---|---|
| 2,406,790 | Beatty | Sept. 3, 1946 |
| 2,492,736 | Custin | Dec. 27, 1949 |